Dec. 26, 1961 L. J. CASTELLANOS 3,014,450
UNDERWATER PIPE LOCATING DEVICE
Filed March 21, 1960 3 Sheets-Sheet 1

INVENTOR.
LEO J. CASTELLANOS,
BY *John J. Schneider*
ATTORNEY.

INVENTOR.
LEO J. CASTELLANOS,
BY John J. Schneider
ATTORNEY.

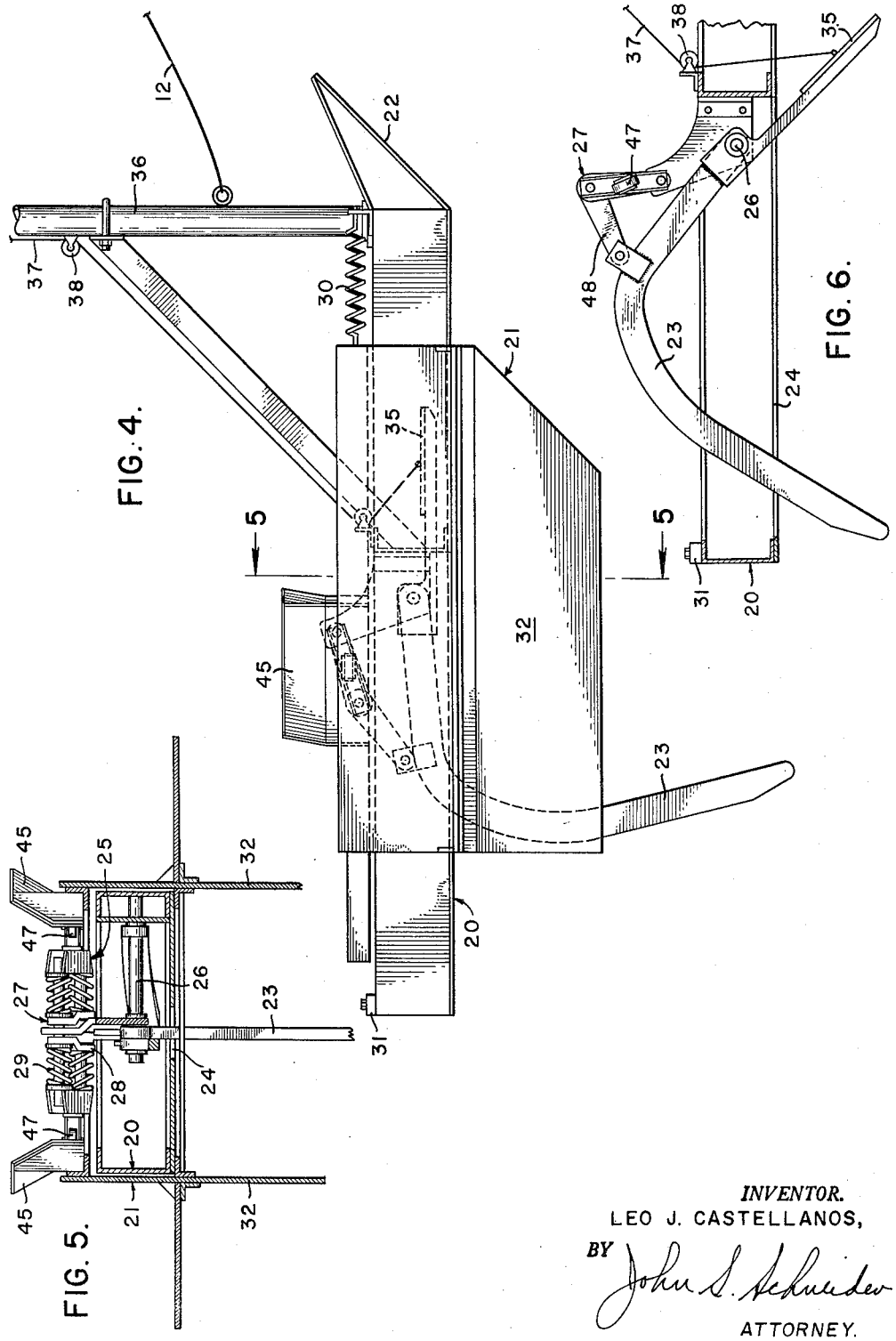

United States Patent Office

3,014,450
Patented Dec. 26, 1961

3,014,450
UNDERWATER PIPE LOCATING DEVICE
Leo John Castellanos, Annapolis, Md., assignor, by mesne assignments, to Jersey Production Research Company, Tulsa, Okla., a corporation of Delaware
Filed Mar. 21, 1960, Ser. No. 16,364
3 Claims. (Cl. 116—132)

This invention concerns apparatus for determining the position of pipelines buried under bodies of water.

The location of sunken, underwater pipelines is desirable and necessary for many reasons, as for example, for maintenance purposes or for surveys of offshore areas preliminary to offshore construction activities or offshore drilling operations.

Briefly, the apparatus of the invention comprises a submerged structure adapted to be towed along the ground underlying water which includes means adapted to releasably engage submerged subterranean pipes (or other objects); and signaling means operatively connected to the pipe engaging means for indicating at the water surface the presence of pipes snared by the pipe engaging means.

It is an object of the invention to provide improved mechanical apparatus, which can be towed behind a boat, for ascertaining the location of submerged pipelines.

Another object of the invention is to provide a method of probing for underwater objects remotely, utilizing a sled having an earth probing device mounted thereon and adapted to be pulled along the ground underlying the water.

An additional object of the invention is to provide indicating means above the water to indicate when the earth probing device has engaged a pipeline or other objects.

A further object of the invention is to provide a means for creating extra drag on the boat used to pull the sled along the water bottom when the earth probing device has engaged the submerged object.

Another object of the invention is to provide a trip mechanism associated with the earth probing device to protect submerged objects from damage.

A further object of the invention is to provide means for automatically varying compression (adjustment) on the trip mechanism to compensate for the plowing resistance in different classes of soil.

Additional objects and advantages of the invention will be apparent from a description of the invention taken in conjunction with the drawings wherein:

FIG. 4 is a side view of the submerged part of the apparatus showing the pipe engaging element in dragging position;

FIG. 5 is a sectional view taken on lines 5—5 of FIG. 4; and

FIG. 6 is a fragmentary view of the pipe engaging element in retracted position and associated mechanism.

Figure 1:
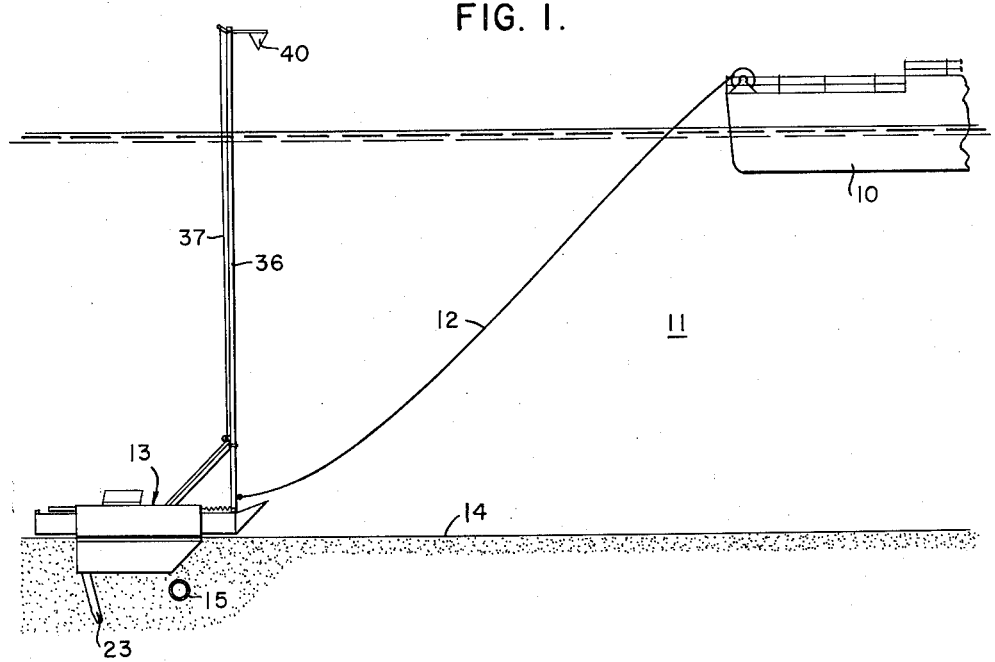
FIG. 1 shows the device of the invention in tow with the pipe engaging and signaling portions thereof in their pre-pipe engaging positions.
Figure 2:
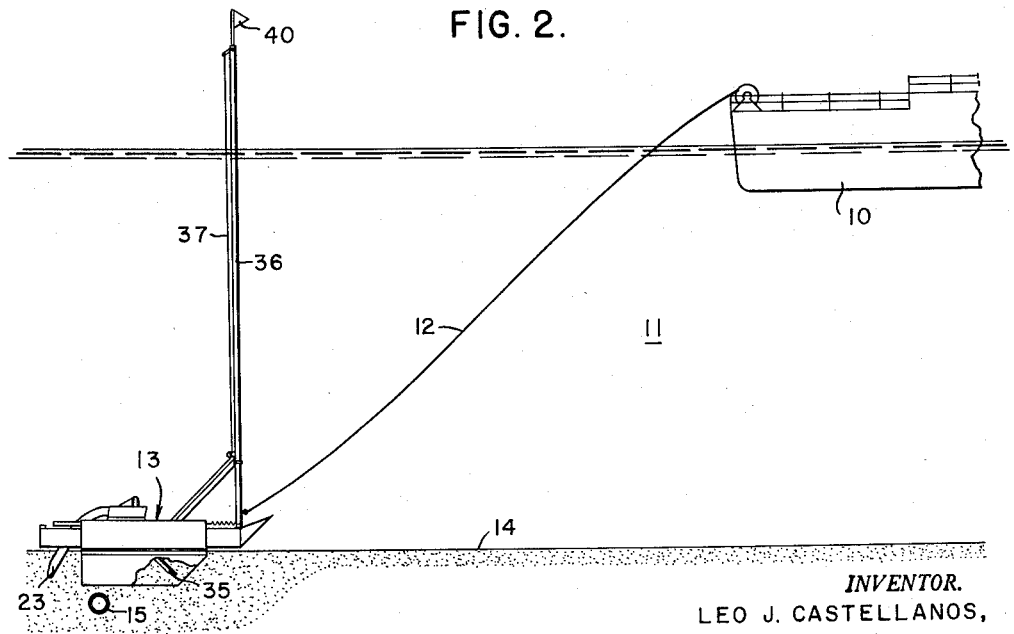
FIG. 2 is a view similar to that of FIG. 1 showing the pipe engaging and signaling portions of the apparatus in their post-pipe engaging positions.

Reference to the drawings in greater detail will now be made. FIGS. 1 and 2 show a boat 10 floating on the surface of a body of water 11 and connected by a tow line 12 to a submerged pipe engaging structure, generally designated 13, which is adapted to slide along the ground 14 underlying water 11. In FIG. 1, pipe 15 buried in ground 14 has not yet been engaged by the apparatus 13 whereas in FIG. 2, pipe 15 has been engaged by apparatus 13 and the detection thereof has been indicated.

FIGS. 3 to 6 show details of the pipe engaging apparatus 13 which includes a frame member 20, formed as a flat-bottomed boat or sled with an upward sloping bow 22. Frame member 20 is slidably arranged in a frame member 21 and connected thereto by means of springs 30. Frame 20 is provided with a shaft 26 upon which a grappler hook 23 is mounted for rotation. The after end of hook 23 extends through a slot 24 formed in the bottom of sled frame 20. The upper portion of hook 23 is connected by means of links 48 to a releasable hook locking mechanism, generally designated 25, which also is arranged on sled frame 20. As seen more clearly in FIG. 3a, mechanism 25 includes jaw clutch 27 formed of mating clutch plates 28 and 28a which are biased together by springs 29 positioned between clutch plates 28 and backing plates 46. Rollers 47 are attached to backing plates 46 (see FIG. 3). The forward portion of hook 23, which may be made integral with the after portion thereof or made of a rigidly connected separate section, as shown, is provided with a spade-like blade 35. Stops 31 are arranged on frame 20 to engage the rear end of frame 21 and prevent further movement of frame 21 in the aft direction. Frame 21 is provided with two vertically extending keel members 32, which extend below frame 20 and two inclined plates 45, which bear against rollers 47.

Adjacent to the bow 22 of sled frame 20 is a mast 36 which extends above the surface of the body of water 11. A line or cable 37 is connected at one end to the forward portion of hook 23, as at blade 35, and extends through pulleys 38 or other suitable guides to the top of mast 36 where it is connected at the other end thereof to a flag 40 or other suitable signaling element.

In operation, the pipe engaging apparatus 13 is dragged along the ground 14 in which submerged pipelines, such as 15, are located by boat 10 and tow line 12. Grapple hook 23 extending through the bottom of the sled frame 20 reaches down some distance below the bottom of the sled and will snare any buried pipeline within the depth of its reach as the sled is dragged over the pipeline. As the apparatus is dragged along the water bottom, keels 32 penetrate the bottom soil or ground 14 to a depth which varies with the degree of compaction of the soil. The keels offer resistance to dragging of pipe engaging apparatus 13 and this resistance is greater when the apparatus is dragged over hard or compact soil than when it is dragged over soft or loose soil. When the apparatus is dragged over more compact soil and the dragging resistance of keels 32 increases, frame member 21 is forced to move backward with respect to sled frame 20 against the bias of springs 30. This movement causes inclined plates 45, mounted on frame 21, to move the roller members 46 inwardly against the bias of springs 29 which, in turn, increases the pressure between clutch plates 28, 28a thereby requiring a greater force on grapple hook 23 to trip the release mechanism. When the apparatus is dragged over softer formations the dragging resistance of keels 32 lessens and the reaction of springs 30 retracts frame 21 to a position where less pressure is exerted on clutch plates 28, 28a by springs 29 which permits the release mechanism to trip under a smaller hook load.

To prevent damage to pipeline 15, or to pipe engaging apparatus 13, grapple hook 23 swings upward on shaft 26 when the hook contacts a resisting obstacle. When a sufficient force is applied to hook 23, the mating jaws 28, 28a jump past each other and hook 23 is free to swing upwardly. The amount of force required to release the jaw clutches is varied by varying the pressure exerted by springs 29. The intensity of spring pressure is determined by the relative position of the inclined plates 45.

Figure 3:
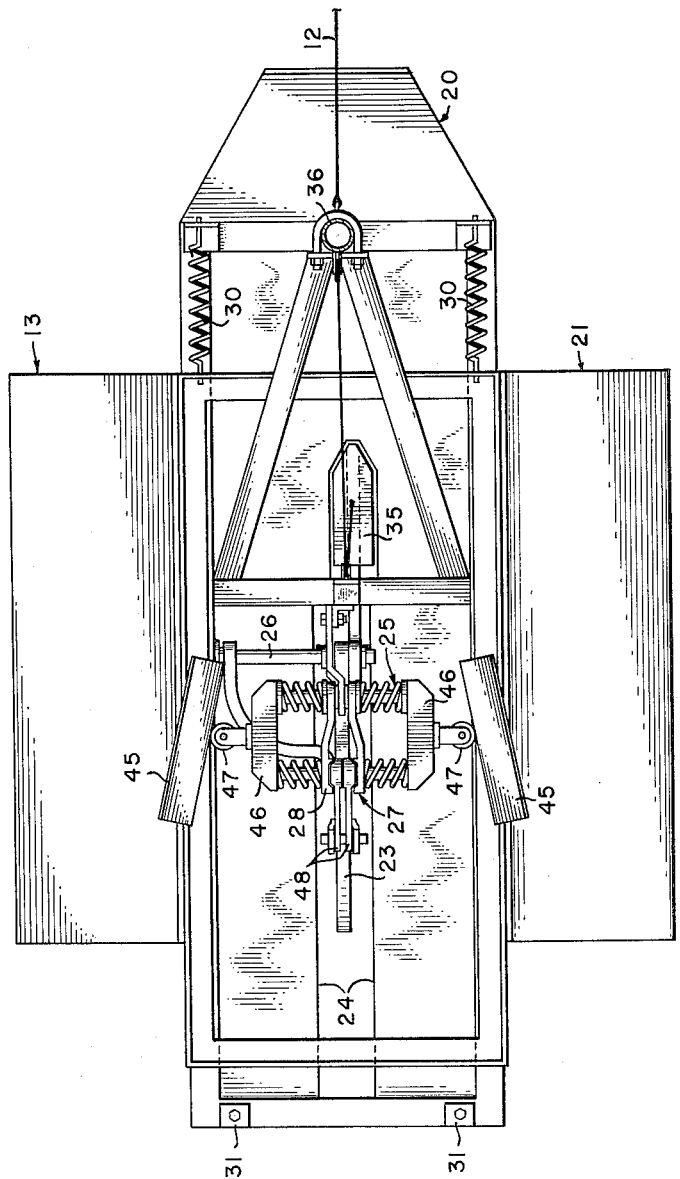
FIG. 3 is a top view of the submerged part of the apparatus of the invention.
Figure 3A:
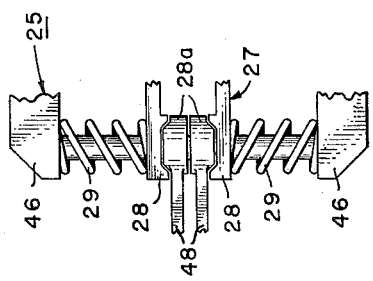
FIG. 3a is an enlarged fragmentary view of the clutch mechanism of FIG. 3.

When the hook release mechanism 25 trips and grapple hook 23 swings upwardly, blade 35 swings downwardly to a position in which it penetrates the ground 14 underlying the water. Continued dragging of the apparatus 13 causes blade 35, as shown in FIG. 3, to dig into the ground 14 and offer considerably increased resistance to dragging. This feature of the invention prevents the operator of the tow boat 10 from dragging the apparatus 13 any great distance from the submerged pipeline 15 following tripping of the hook release mechanism 25. Movement of blade 35 downwardly pulls line 37 downwardly which, in turn, causes flag 40 to move into an upright or signaling position.

If desired, a lever or other suitable mechanism may be attached to the mast for pulling up on line 37 for the purpose of lowering the grapple hook and resetting the release mechanism 25 when it is desired to resume dragging operations after hook 23 has been tripped by previous contact.

Having fully described the nature, objects, and operation of my invention, I claim:

1. An underwater object locating device comprising a first frame member; two laterally spaced-apart keel members extending downwardly from the underside of said first frame member; a second frame member formed as a sled slidably arranged on said first frame member; resilient means interconnecting said first and second frame members; a grappler hook having a first extended and a second retracted position pivotally mounted on said first frame member and having a blade mounted thereon; means mounted on said second frame member adapted to releasably lock said hook in its first position and including engaged clutch plates linked to said hook, biasing means urging said clutch plates into their engaged position in which position said hook is in its first position, and rollers mounted on said biasing means; laterally spaced-apart plates inclined toward each other arranged on said first frame member and engaging said rollers in a manner such that movement of said first frame member in a backward direction relative to said second frame member moves said rollers along said inclined plates in a direction which increases compression of said biasing means and in consequence increases the force of the clutch plates holding said hook in its first position and movement of said first frame member in a forward direction relative to said second frame member moves said rollers along said inclined plates in a direction which decreases compression of said biasing means and in consequence decreases the force of the clutch plates holding said hook in said first position; means connected to said second frame member adapted to pull said first and second frame members along the bottom underlying the water; a mast mounted on said second frame member adapted to extend therefrom to above the surface of the water when said first and second frame members are positioned on the bottom underlying the water; and signaling means associated with the upper end of said mast and said hook adapted to actuate upon pivotal movement of said hook from a first to a second position upon engagement of said hook with a submerged object, said blade engaging the bottom underlying the water when said hook moves from its first to its second position.

2. An underwater object locating device comprising a first frame member; keel means extending downwardly from the underside of said first frame member; a second frame member slidably arranged on said first frame member; resilient means interconnecting said first and second frame members; probing means pivotally mounted on said second frame member adapted to extend into the bottom underlying the water to engage submerged subterranean objects when in a first extended position and to pivot to a second retracted position upon engagement of said probing means with said objects; means arranged on said probing means adapted to engage the bottom underlying the water when said probing means pivots from its first to its second position; means mounted on said second frame member and engaging said probing means adapted to lock said probing means in its first position until a predetermined force caused by engagement of said probing means with the submerged objects releases said hook and permits it to pivot from its first to its second position; means connected to said releasable locking means and means mounted on said first frame member cooperating to automatically vary the force required to release said locking means compensate for the resistance of said probing means in different types of bottom underlying the water; and signaling mean connected to said probing means adapted to provide surface indications of pivotal movement of said probing means from its first to its second position.

3. An underwater object locating device comprising a first frame member; a second frame member slidably arranged on said first frame member; resilient means interconnecting said first and second frame members; probing means pivotally mounted on said second frame member adapted to extend into the bottom underlying the water to engage submerged subterranean objects when in a first position and to pivot to a second retracted position upon engagement of said probing means with said objects; means mounted on said second frame member and engaging said probing means adapted to lock said probing means in its first position until a predetermined force caused by engagement of said probing means with submerged objects releases said hook and permits it to pivot from its first to its second position; and signaling means connected to said probing means adapted to provide surface indication of the pivotal movement of said probing means from its first to its second position.

References Cited in the file of this patent

UNITED STATES PATENTS

| | | |
|---|---|---|
| 275,864 | Schonhoff | Apr. 17, 1883 |
| 493,826 | James | Mar. 21, 1893 |